UNITED STATES PATENT OFFICE.

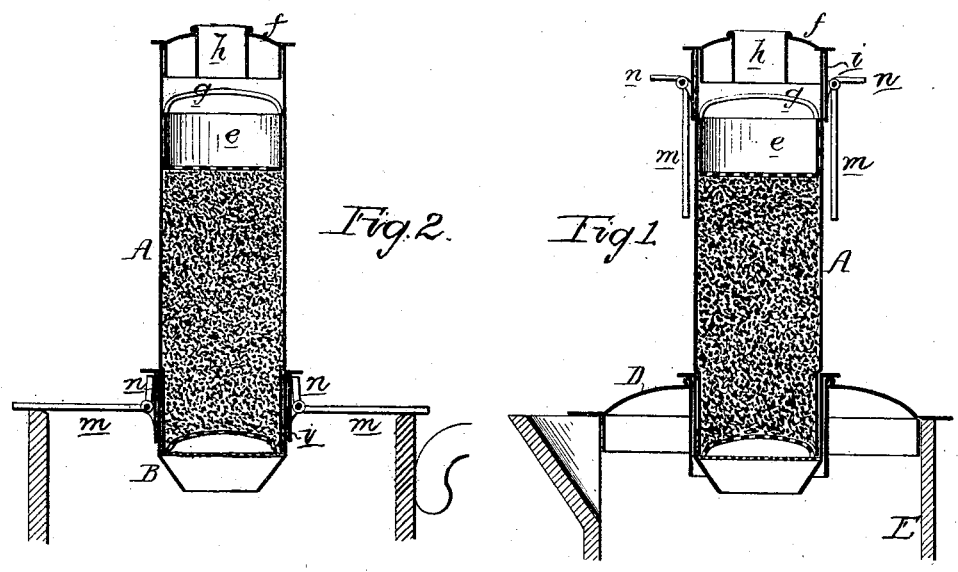
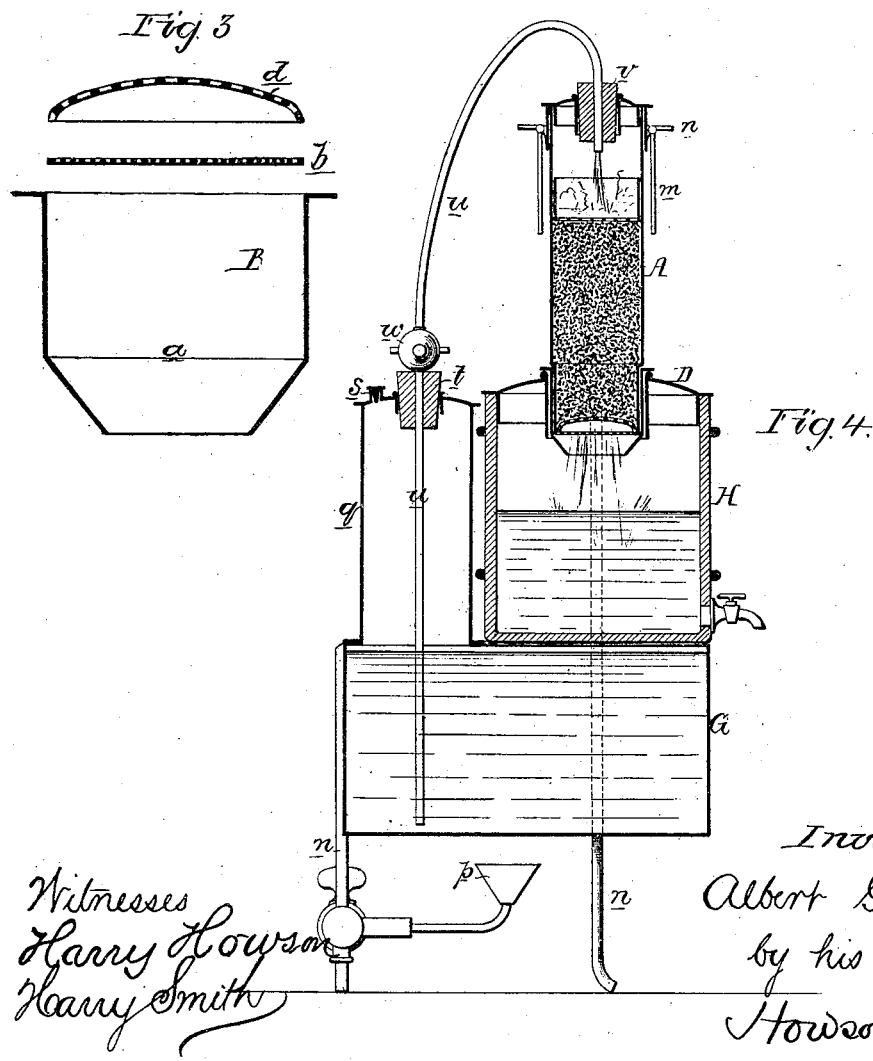

ALBERT G. BUZBY, OF PHILADELPHIA, PENNSYLVANIA.

IMPROVEMENT IN COFFEE-MAKING APPARATUS.

Specification forming part of Letters Patent No. 191,106, dated May 22, 1877; application filed January 3, 1876.

*To all whom it may concern:*

Be it known that I, ALBERT G. BUZBY, of Philadelphia, Pennsylvania, have invented an Improved Coffee-Making Apparatus, of which the following is a specification:

The main object of my invention is to so construct a coffee-reservoir for making coffee that the said reservoir may be combined with a coffee-pot of almost any form, and that the hot water may be caused to pass freely through the entire mass of coffee without interruption, a further object being to combine, in an economical and small compass, this coffee-making apparatus with a boiler, which automatically furnishes the desired hot water. These objects I attain in the manner which I will now proceed to describe, reference being had to the accompanying drawing, in which—

Figs. 1 and 2 are sectional views of my coffee-making apparatus; Fig. 3, enlarged sectional views of parts of Figs. 1 and 2. Fig. 4, a view of the coffee-making apparatus, combined with a boiler and receiving-vessel.

In Figs. 1, 2, and 3, A represents the reservoir for containing the coffee, this reservoir being by preference of cylindrical form, and made of tinned plated or plated ware. The lower end of the cylinder is slightly contracted so as to fit snugly within the casing B, which thus supports the upper section A, the said casing forming the lower section of the reservoir, and being made tapering at its lower end, so that an internal ledge shall be formed at $a$, on which rests a perforated plate or wire-gauze disk, $b$, and above the latter bears a concavo-convex plate, $d$, with larger openings or coarser meshes than those of the plate below, as shown in the enlarged section, Fig. 3.

On the top of the coffee in the reservoir rests a small vessel, $e$, having a perforated bottom, and a wire, $g$, or other attachment, by which the vessel may be removed. In the top of the reservoir fits a cover, $f$, having a central opening, $h$, through which the boiling water may be poured.

In Fig. 1 the reservoir is fitted at its lower end to a socket formed in the center of the cover D of a coffee pot or jug, E, but the apparatus may be applied to an ordinary coffee-cup or other vessel without the intervention of the said cover D, for the reservoir is provided with a detachable ring, $i$, to which are hinged any desired number of arms, $m$, the latter when not required for use hanging down out of the way, as in Fig. 1, but when the apparatus has to be applied to the edge of a coffee-cup, as shown in Fig. 2, the ring $i$ is removed from the top of the reservoir and fitted to the lower section B of the same, after which the arms $m$ are moved to a horizontal position so as to rest on the edge of the cup into which the liquid falls from the reservoir. These arms $m$ are provided with short projections $n$, which, bearing against the ring $i$, serve to maintain the said arms in the desired horizontal position.

When the apparatus has to be used by travelers who desire to make their own coffee, the reservoir may have no other appurtenances than the ring $i$ with its arms, which may be readily adjusted as shown in Fig. 1, when it will occupy but little space. For family use the reservoir, with or without the ring and arms, may be combined with the cover D of the coffee pot or jug E, or the reservoir may be applied to the more costly and elaborate apparatus described hereafter.

It will be noticed that as the upper section is open at the bottom as well as at the top, and as the lower perforated plates are readily removable, the holder can be very readily cleaned; and, since the upper section is supported solely by the lower one, the holder can be applied the more readily to coffee-pots or other vessels of any description.

By making the concavo-convex plate $d$ with larger openings than the lower plate there is always a free discharge of the decoction at the lower end of reservoir, and the finer grounds, which usually collect in the corners, escape onto the lower plate, and thus obviate any clogging and interruption of the flow of liquid; but at the same time the said grounds are retained from passing into the coffee by the lower plate with its finer perforations.

On placing the coffee in the reservoir it is preferable to slightly wet it, after which the small vessel $e$ should be placed lightly on the top of the coffee, for pressure applied to the latter would interfere with the percolation of the water through the mass.

In Fig. 4 the coffee-making reservoir is applied to the cover D of a reservoir, H, which is made of glass or earthen ware, for metal should always be avoided as a material whereof to make a receptacle for containing liquid coffee. Below this vessel is a boiler, G, supported on legs n, and below the boiler is a gas-burner, p, to the pipe of which may be connected an ordinary flexible tube, attached to any adjoining burner.

A cylindrical casing, q, incloses the steam-space of the boiler, and on top of this casing is a small safety-valve, which will be elevated under a given pressure.

A tube, u, passes through a cork or plug, t, fitted to the top of the casing q, and extends in one direction to the bottom of the boiler, and in the other direction through a plug or cork, v, fitted to the central opening of the cover f of the coffee-reservoir A.

The pressure of steam will force the boiling water through the tube, whence it will pass in a small stream into the vessel e of the reservoir, and thence through the mass of ground coffee into the receiving-vessel H.

I do not desire to claim, broadly, a coffee-reservoir made in two sections, nor the combination of a coffee-making apparatus with a boiler; but

I claim as my invention—

1. In a coffee-reservoir, the coffee-holding section A, open at both ends when detached, and supported solely by the lower section B, having a detachable strainer or strainers, as described.

2. The combination of the section B and the concavo-convex plate d, having large openings, with the disk b having smaller openings, as and for the purpose set forth.

3. The combination of the coffee-reservoir with the ring i and its arms m, as and for the purpose specified.

4. The combination of the reservoir A and vessel H, with the boiler G, on which the vessel rests, and with the steam-section q, arranged substantially as described.

In testimony whereof I have signed my name to this specification in the presence of two subscribing witnesses.

ALBERT G. BUZBY.

Witnesses:
HARRY HOWSON, Jr.,
HARRY SMITH.